United States Patent
Wang

(10) Patent No.: US 9,276,748 B2
(45) Date of Patent: Mar. 1, 2016

(54) DATA-ENCRYPTING METHOD AND DECRYPTING METHOD FOR A MOBILE PHONE

(71) Applicant: HUIZHOU TCL MOBILE COMMUNICATION CO., LTD, Huizhou, Guangdong (CN)

(72) Inventor: Yahui Wang, Guangdong (CN)

(73) Assignee: HUIZHOU TCL MOBILE COMMUNICATION CO., LTD, Huizhou, Guangdong (CN)

( * ) Notice: Subject to any disclaimer, the term of this patent is extended or adjusted under 35 U.S.C. 154(b) by 0 days.

(21) Appl. No.: 14/386,599

(22) PCT Filed: Mar. 19, 2013

(86) PCT No.: PCT/CN2013/072878
§ 371 (c)(1),
(2) Date: Sep. 19, 2014

(87) PCT Pub. No.: WO2013/149548
PCT Pub. Date: Oct. 10, 2013

(65) Prior Publication Data
US 2015/0071442 A1    Mar. 12, 2015

(30) Foreign Application Priority Data
Apr. 6, 2012   (CN) .......................... 2012 1 0100946

(51) Int. Cl.
*H04K 1/00*    (2006.01)
*H04L 9/32*    (2006.01)
*H04W 12/02*   (2009.01)
*H04W 12/08*   (2009.01)
*G06F 21/60*   (2013.01)
*G06F 21/62*   (2013.01)
*H04L 9/08*    (2006.01)
*H04W 12/12*   (2009.01)

(52) U.S. Cl.
CPC ............ *H04L 9/3226* (2013.01); *G06F 21/602* (2013.01); *G06F 21/6209* (2013.01); *H04L 9/0863* (2013.01); *H04L 9/0866* (2013.01); *H04W 12/02* (2013.01); *H04W 12/08* (2013.01); *G06F 2221/2107* (2013.01); *H04L 2209/80* (2013.01); *H04W 12/12* (2013.01)

(58) Field of Classification Search
CPC ..... H04L 9/3226; H04W 12/08; H04W 12/02
See application file for complete search history.

(56) References Cited

U.S. PATENT DOCUMENTS

2010/0146274 A1*   6/2010   Naslund et al. ............... 713/168

FOREIGN PATENT DOCUMENTS

| CN | 101986336 A | 3/2011 |
|---|---|---|
| CN | 102170357 A | 8/2011 |
| CN | 102281324 A | 12/2011 |
| CN | 102647712 A | 8/2012 |

* cited by examiner

Primary Examiner — Esther B Henderson
(74) Attorney, Agent, or Firm — Ladas & Parry LLP

(57) ABSTRACT

Disclosed is a cell phone data encryption method, which comprises the steps of obtaining a PIN code which is input by a user, obtaining a SIM card code from a SIM card according to the PIN code, and combining the PIN code with the SIM card code to form a password string; and encryption source data using the password string, so as to obtain encrypted data. Also provided is a cell phone data encryption method. Through the manner mentioned above, the technical solution provided in the present invention can protect cell phone data.

10 Claims, 5 Drawing Sheets

DATA-ENCRYPTING METHOD AND DECRYPTING METHOD FOR A MOBILE PHONE

This application is a national phase entry under 35 USC 371 of International Patent Application No. PCT/CN2013/072878 filed on 19 Mar. 2013, which was published on 10 Oct. 2013 with International Publication Number WO 2013/149548 A1, which claims priority from Chinese Patent Application No. 201310100946.6 filed on 6 Apr. 2012, the disclosures of which are incorporated in their entirety by reference herein.

FIELD OF THE INVENTION

The present disclosure relates to the field of mobile phone devices, and more particularly to a data-encrypting method and a data-decrypting method for a mobile phone.

BACKGROUND OF THE INVENTION

For users of conventional mobile phones, loss of the mobile phones might cause the malicious use of photographs, video information or financial information stored in the mobile phones and the leak of personal privacy information, which might generate a great influence on the owner of the mobile phone.

Furthermore, WIFI networks have now been widely deployed in public places such as cafes, restaurants and libraries, etc. When the mobile phones are used to browse webpage or execute network applications via the WIFI networks, there is a risk that documents stored in the mobile phones are stolen by hackers.

In case the documents stored in the mobile phones are obtained by malicious persons, the malicious persons might upload the documents to the Internet for browsing by the public to cause the leak of the personal privacy information of the owner of the mobile phone, and even worse, might racketeer the owners of the mobile phones to cause substantial economic loss to the owners.

Accordingly, what is needed is providing a data-encrypting method and a data-decrypting method for a mobile phone so as to protect security of data of the mobile phone.

SUMMARY OF THE INVENTION

A main technical problem to be solved by the present disclosure is to provide a data-encrypting method and a data-decrypting method for a mobile phone so as to protect security of data of the mobile phone.

To solve the aforesaid technical problem, a technical solution adopted by the present disclosure is to provide a data-encrypting method for a mobile phone. The data-encrypting method for a mobile phone comprises: obtaining a PIN code input by a user and obtaining an SIM card code from an SIM card according to the PIN code, and combining the PIN code and the SIM card code into a password string; using the password string to encrypt source data so as to obtain encrypted data; and setting an encrypted-data identification (ID) code by using an IMEI number of the mobile phone, and putting the encrypted-data ID code before the encrypted data.

The step of using the password string to encrypt source data so as to obtain encrypted data comprises: reading the source data in units of the number of the bytes of the password string; performing a logic operation on the password string and the source data that is read; and storing the source data, which is obtained from the logic operation, as the encrypted data.

The logic operation is an XOR operation.

To solve the aforesaid technical problem, another technical solution adopted by the present disclosure is to provide a data-decrypting method for a mobile phone. The data-decrypting method for a mobile phone comprises: obtaining a PIN code input by a user and obtaining an SIM card code from an SIM card according to the PIN code, and combining the PIN code and the SIM card code into a password string; and using the password string to decrypt encrypted data so as to obtain source data.

The step of using the password string to decrypt encrypted data so as to obtain source data comprises: reading the encrypted data in units of the number of the bytes of the password string; performing a logic operation on the password string and the encrypted data that is read; and storing the encrypted data, which is obtained from the logic operation, as the source data.

The logic operation is an XOR operation.

To solve the aforesaid technical problem, yet another technical solution adopted by the present disclosure is to provide a data-encrypting method for a mobile phone. The data-encrypting method for a mobile phone comprises: obtaining a PIN code input by a user and obtaining an SIM card code from an SIM card according to the PIN code, and combining the PIN code and the SIM card code into a password string; and using the password string to encrypt source data so as to obtain encrypted data.

Preferably, the step of using the password string to encrypt source data so as to obtain encrypted data comprises: reading the source data in units of the number of the bytes of the password string; performing a logic operation on the password string and the source data that is read; and storing the source data, which is obtained from the logic operation, as the encrypted data.

Preferably, the step of performing a logic operation on the password string and the source data that is read comprises: performing logic operation directly on the password string and the source data that is read when the number of the bytes of the source data that is read is equal to the number of the bytes of the password string; and extracting part of the password string, of which the number of the bytes is equal to the number of the bytes of the source data that is read, from the password string, and then performing a logic operation on the part of the password string and the source data that is read when the number of the bytes of the source data that is read is less than the number of the bytes of the password string.

Preferably, after the step of using the password string to encrypt source data so as to obtain encrypted data, an encrypted-data identification (ID) code is set by using an IMEI number of the mobile phone, and the encrypted-data ID code is put before the encrypted data.

Preferably, the logic operation is an XOR operation.

To solve the aforesaid technical problem, another technical solution adopted by the present disclosure is to provide a data-decrypting method for a mobile phone. The data-decrypting method for a mobile phone comprises: obtaining a PIN code input by a user and obtaining an SIM card code from an SIM card according to the PIN code, and combining the PIN code and the SIM card code into a password string; and using the password string to decrypt encrypted data so as to obtain source data.

Preferably, the step of using the password string to decrypt encrypted data so as to obtain source data comprises: reading the encrypted data in units of the number of the bytes of the password string; performing a logic operation on the password string and the encrypted data that is read; and storing the encrypted data, which is obtained from the logic operation, as the source data.

Preferably, the step of performing a logic operation on the password string and the encrypted data that is read comprises: performing a logic operation directly on the password string and the encrypted data that is read when the number of the bytes of the encrypted data that is read is equal to the number of the bytes of the password string; and extracting part of the password string, of which the number of the bytes is equal to the number of the bytes of the encrypted data that is read, from the password string, and then performing a logic operation on the part of the password string and the encrypted data that is read when the number of the bytes of the encrypted data that is read is less than the number of the bytes of the password string.

Preferably, after the step of using the password string to decrypt encrypted data so as to obtain source data, an encrypted-data identification (ID) code put before the encrypted data is removed according to an IMEI number of the mobile phone.

Preferably, the logic operation is an XOR operation.

As compared to the prior art, the benefits of the present disclosure are as follows: the data-encrypting method and the data-decrypting method for a mobile phone of the present disclosure encrypt or decrypt documents stored in the mobile phone by combining the SIM card code and the PIN code into a password string, and in this way, the data of the mobile phone will not be stolen and security of the data can be protected.

DETAILED DESCRIPTION OF THE INVENTION

Figure 1:
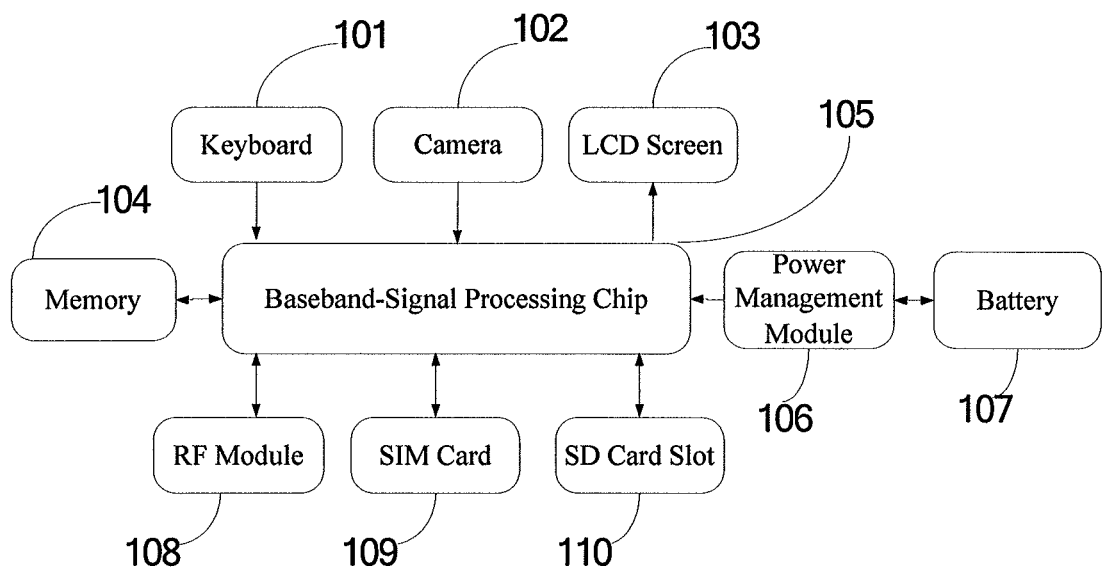
FIG. 1 is a functional block diagram of a mobile phone based on a data encrypting/decrypting method for a mobile phone of the present disclosure.

Referring to FIG. 1 firstly, FIG. 1 is a functional block diagram of a mobile phone based on a data encrypting/decrypting method for a mobile phone of the present disclosure. As shown in FIG. 1, the mobile phone based on the data encrypting/decrypting method for the mobile phone of the present disclosure mainly comprises: a keyboard 101, a camera 102, an LCD (Liquid Crystal Display) screen 103, a memory 104, a baseband-signal processing chip 105, a power management module 106, a battery 107, an RF (Radio Frequency) module 108, an SIM card 109 and an SD (Secure Digital Memory Card) card slot 110. The functions of the above modules are as follows:

the keyboard 101: comprising a physical keyboard or a virtual keyboard located on a touch screen, and being configured to control the system of the mobile phone;

the camera 102: being configured to take a photograph or record a video, where the photographs or video data captured by the camera can be encrypted by the present disclosure, the LCD screen 103: being configured to display a control interface;

the memory 104: being configured to store systems and programs for implementing the method of the present disclosure, and also store personal data (e.g., photographs, videos, recordings, messages and the address book of the mobile phone) of the user, where the personal data in the memory can be encrypted or decrypted, the baseband-signal processing chip 105: being used as a central processing unit, and being configured to control peripheral modules of the system;

the power management module 106: being configured to convert energy of the battery into a voltage necessary for the operation of the functional modules;

the battery 107: being configured to provide the energy for the system;

the RF module 108: being configured to achieve communication between the system of the mobile phone and the external network, and in the present disclosure, being further configured to receive control information transmitted from the outside by the user of the mobile phone;

the SIM (Subscriber Identity Module) card 109: being configured to store an SIM card code and a network identification code of the user, where the SIM card 109 can be activated fir PIN code detection. Only if a PIN code authentication of the SIM card passes, the network data in the SIM card can be accessed by the mobile phone, the SD card slot 110: being configured to connect with the SD card and allow the user to expand a space for storing data documents easily, where the personal data in the SD card can also be encrypted or decrypted, and when a message for erasing personal information is received by the system of the mobile phone, the system will erase all of the data in the SD card automatically. In the present disclosure, the data in the SD card slot can be encrypted.

Thus, in terms of the hardware, the mobile phone based on the data encrypting/decrypting method for the mobile phone of the present disclosure is exactly the same as the conventional mobile phone. By writing the data encrypting/decrypting method for the mobile phone of the present disclosure into the baseband-signal processing chip 105, the baseband-signal processing chip 105 can encrypt or decrypt the data of the mobile phone according to the method. Specifically, the data encrypting/decrypting method for the mobile phone can be implemented by software codes.

The data encrypting/decrypting method for a mobile phone of the present disclosure will be described in detail with reference to FIG. 2 to FIG. 5.

Figure 2:
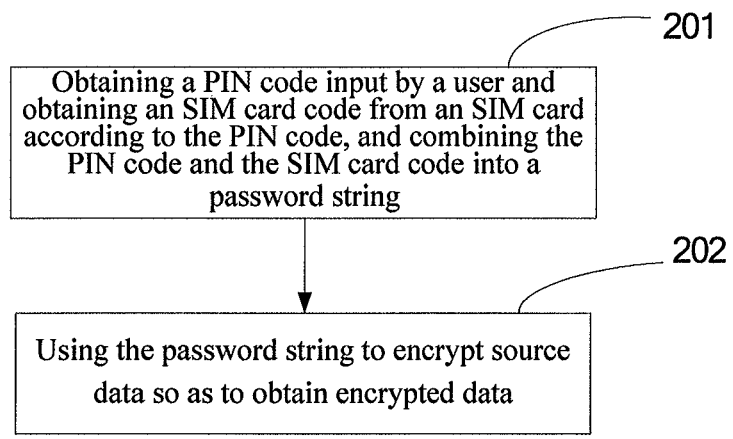
FIG. 2 is a flowchart diagram of a first embodiment of a data-encrypting method for a mobile phone according to the present disclosure.

Referring to FIG. 2, FIG. 2 is a flowchart diagram of a first embodiment of a data-encrypting method for a mobile phone according to the present disclosure. As shown in FIG. 2, the data-encrypting method for the mobile phone of the present disclosure comprises following steps of:

Step 201: obtaining a PIN (Personal Identification Number) code input by a user and obtaining an SIM card code from the SIM card 109 according to the PIN code, and combining the PIN code and the SIM card code into a password string; and Step 202: using the password string to encrypt source data so as to obtain encrypted data.

In the step 201, the user can ask for the PIN code from the network operator, and input the PIN code via the keyboard 101. The baseband-signal processing chip 105 obtains the PIN code, obtains the SIM card code from the SIM card 109 according to the PIN code, and combines the PIN code and the SIM card code into a password string. The PIN code and the SIM card code can be combined together either with the PIN code preceding the SIM card code or with the SIM card code preceding the PIN code, or by inserting characters of the PIN code into the SIM card code to form the password string. Preferably, the PIN code and the SIM card code are combined with the PIN code preceding the SIM card code to form the password string in the present disclosure.

Additionally, after obtaining the PIN code, the baseband-signal processing chip 105 can further store the PIN code into the memory 104 for subsequent use in the data-decrypting method for a mobile phone.

Specifically, in the step 202, the source data can be read in units of a number of bytes of the password string, a logic operation is performed on the password string and the source data that is read, and the source data which has been performed the logic operation on is stored as the encrypted data, thus obtaining the encrypted data.

In the step of performing the logic operation on the password string and the source data that is read, the logic operation is performed directly on the password string and the source data that is read when the number of the bytes of the source data that is read is equal to a number of bytes of the password string; and when the number of the bytes of the source data that is read is less than the number of the bytes of the password string, a part of the password string, of which the number of the bytes is equal to the number of the bytes of the source data that is read, is extracted from the password string, and then the logic operation is performed on the part of the password string and the source data that is read.

Figure 3:
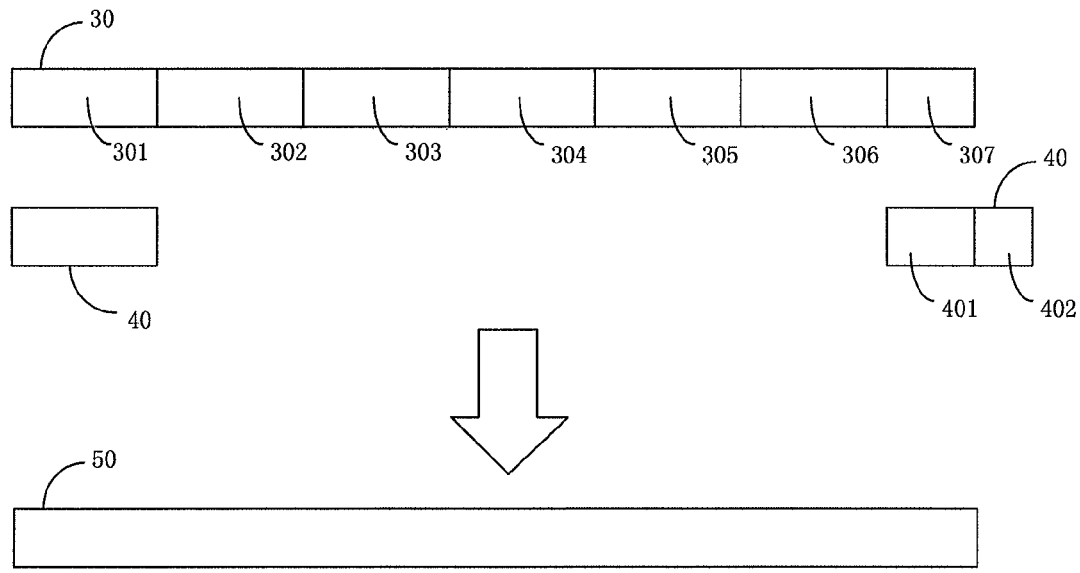
FIG. 3 is a schematic view illustrating how source data is read in the first embodiment of the data-encrypting method for a mobile phone according to the present disclosure.

Specifically, referring to FIG. 3, FIG. 3 is a schematic view illustrating how source data is read in the first embodiment of the data-encrypting method for a mobile phone according to the present disclosure. As shown in FIG. 3, a password string 40 consists of a PIN code (of 4 bytes) and an SIM card code (of 16 bytes), so the number of the bytes of the password string 40 is 20 bytes. Assuming that the number of bytes of a target data 30 is 132 bytes, the source data 30 can be divided into 7 data blocks (i.e., the data blocks 301-307 as shown in FIG. 3) so that it is read in units of 20 bytes of the password string 40.

When the source data 30 is read in units of the number of the bytes (20 bytes) of the password string 40, dividing the number 132 of the bytes of the source data 30 by the number 20 of the bytes of the password string 40 results in a remainder of 12. Therefore, the number of the bytes of the data blocks 301-306 that are read is 20 bytes, and the number of the bytes of the data block 307 that is read at last is only 12 bytes. When the data block 307 is read in units of 20 bytes, 8 excessive bytes will be read, and the 8 excessive bytes need to be deleted. Specifically, the remainder 12 is subtracted from the number 20 of the bytes of the password string to get a difference value of 8, which is just the number of excessive bytes that would be read when the last data block 307 is read in units of the number of the bytes of the password string 40. Then, the 8 excessive bytes of data are deleted so that the last data block 307 can be read correctly.

Since the number of the bytes of the data blocks 301-306 is the same as the number of the bytes of the password string 40, the logic operation can be performed directly on the password string and each of the data blocks 301-306 respectively. Since the number of the bytes of the data block 307 is 12 which is less than the number 20 of the bytes of the password string 40, part of the password string, of which the number of the bytes is equal to the number of the bytes of the data block 307, can be extracted from the password string 40, and then the logic operation is performed on the part of the password string and the data block 307.

Specifically, data of 12 bytes can be extracted from the beginning of the password string 40 of 20 bytes, and then the logic operation is performed on the data of 12 bytes and the data block 307. Of course, the data of 12 bytes may also be extracted reversely from the end of the password string 40 of 20 bytes, and then the logic operation is performed on the data of 12 bytes and the data block 307, and no limitation is made thereto by the present disclosure.

Accordingly, after the source data 30 is encrypted by using the password string 40, encrypted data 50 can be obtained. The number of the bytes of the encrypted data 50 is the same as that of the source data 30 (i.e., 132 bytes).

In alternative embodiments of the present disclosure, after the encrypted data is obtained, an encrypted-data identification (ID) code may further be set by using an IMEI (International Mobile Equipment Identity) number of the mobile phone, and the encrypted-data ID code is put before the encrypted data 50. Specifically, the IMEI number can be duplicated so that two identical IMEI numbers are combined to form the encrypted-data ID code. The IMEI number has 15 bytes, so the number of the bytes of the two identical IMEI numbers is 30 bytes. After the encrypted-data ID code is set, it can be determined whether the data that is read is encrypted data by detecting the encrypted-data ID code of 30 bytes that is put before the encrypted data 50.

Furthermore, in the data-encrypting method for the mobile phone of the present disclosure, the aforesaid logic operation is preferably an XOR operation. Of course, other logic operations such as the AND operation, the OR operation, or the NOT operation are also covered within the scope of the present invention, and no specific limitation is made thereto by the present disclosure.

Figure 4:
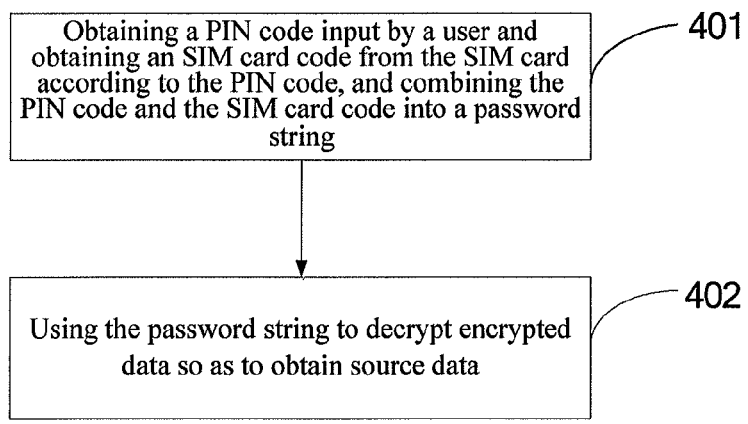
FIG. 4 is a flowchart diagram of a first embodiment of a data-decrypting method for a mobile phone according to the present disclosure.

A data-decrypting method for a mobile phone for decrypting the encrypted data generated by the aforesaid data-encrypting method for a mobile phone will be described in detail with reference to FIG. 4 hereinafter. FIG. 4 is a flowchart diagram of the first embodiment of the data-decrypting method for a mobile phone according to the present disclosure. As shown in FIG. 4, the data-decrypting method for the mobile phone of the present disclosure comprises following steps of:

Step 401: obtaining a PIN code input by a user and obtaining an SIM card code from the SIM card 109 according to the PIN code, and combining the PIN code and the SIM card code into a password string; and Step 402: using the password string to decrypt encrypted data so as to obtain source data.

In the step 401, the user asks for the PIN code from the network operator, and inputs the PIN code via the keyboard 101. The baseband-signal processing chip 105 obtains the PIN code saved in the encrypting step from the memory 104, and compares the saved PIN code with the input PIN code. If the two PIN codes are the same, the SIM card code is obtained from the SIM card 109 by using the PIN code, and the PIN code and the SIM card code are combined into a password string. If the two PIN codes are different from each other, the user will be prompted that the PIN code is wrong and the user needs to re-input the PIN code. The way in which the password string is combined is not limited as long as the password string is the same as that used in the encrypting step.

Specifically, in the step 402, it may be that the encrypted data is read in units of the number of the bytes of the password string, a logic operation is performed on the password string and the encrypted data that is read, and the encrypted data, which has been performed the logic operation on, is stored as the source data, thus obtaining the source data.

In the step of performing a logic operation on the password string and the encrypted data that is read, the logic operation is performed directly on the password string and the encrypted data that is read when the number of the bytes of the encrypted data that is read is equal to the number of the bytes of the password string. When the number of the bytes of the encrypted data that is read is less than the number of the bytes of the password string, part of the password string, of which the number of the bytes is equal to the number of the bytes of the encrypted data that is read, is extracted from the password string, and then the logic operation is performed on the part of the password string and the encrypted data that is read.

Figure 5:
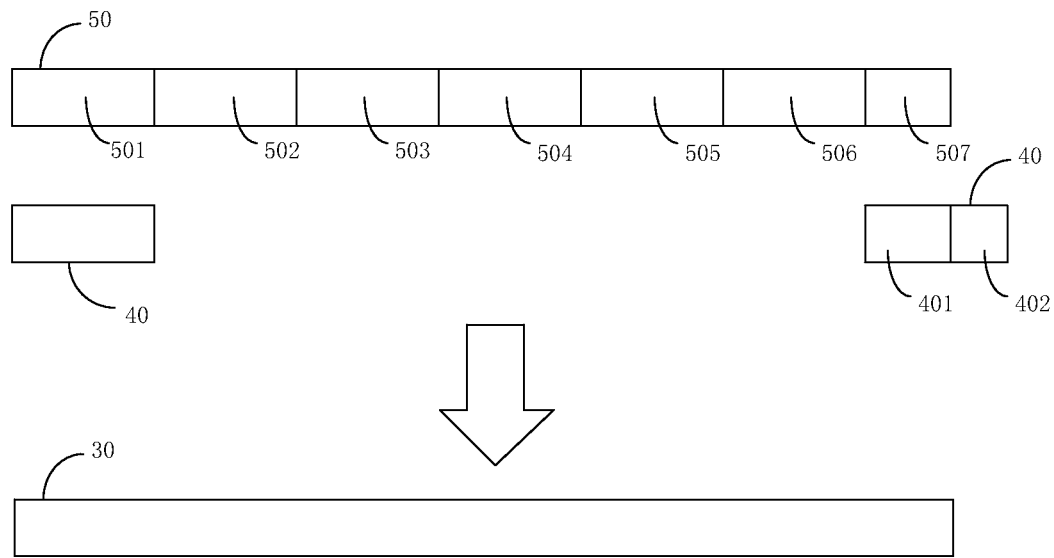
FIG. 5 is a schematic view illustrating how encrypted data is read in the first embodiment of the data-decrypting method for a mobile phone according to the present disclosure.

Specifically, referring to FIG. 5, FIG. 5 is a schematic view illustrating how encrypted data is read in the first embodiment of the data-decrypting method for a mobile phone according to the present disclosure. As shown in FIG. 5, the password string 40 consists of a PIN code (of 4 bytes) and a SIM card code (of 16 bytes), so the number of the bytes of the password string 40 is 20 bytes. If the number of the bytes of the encrypted data 50 is 132 bytes, the encrypted data 50 can be divided into 7 data blocks (i.e., the data blocks 501-507 as shown in FIG. 5) when it is read in units of the number of the bytes (2.0 bytes) of the password string 40.

When the encrypted data 50 is read in units of the number of the bytes (20 bytes) of the password string 40, dividing the number 132 of the bytes of the encrypted data 50 by the number 20 of the bytes of the password string 40 results in a remainder of 12. Therefore, the number of the bytes of the data blocks 501-506 that are read is 20 bytes, and the number of the bytes of the data block 507 that is read at last is only 12 bytes. When the data block 507 is read in units of 20 bytes, 8 excessive bytes will be read, and the 8 excessive bytes need to be deleted. Specifically, the remainder 12 is subtracted from the number 20 of the bytes of the password string to obtain a difference of 8, which is just the number of excessive bytes when the last data block 507 is read in units of the number of the bytes of the password string 40. The 8 excessive bytes are deleted so that the last data block 507 can be read correctly.

Since the number of the bytes of the data blocks 501-506 is the same as the number of the bytes of the password string 40, the logic operation can be performed directly on the password string and each of the data blocks 501-506 respectively. Since the number of the bytes of the data block 507 is 12 which is less than the number 20 of the bytes of the password string 40, a part of the password string, of which the number of the bytes is equal to the number of the bytes of the data block 507, can be extracted from the password string 40, and then the logic operation is performed on the part of the password string and the data block 507.

Specifically, data of 12 bytes can be extracted from the beginning of the password string 40 of 20 bytes, and then the logic operation is performed on the data of 12 bytes and the data block 507. Of course, the data of 12 bytes may also be extracted reversely from the end of the password string 40 of 20 bytes, and then the logic operation is performed on the data of 12 bytes and the data block 507, and no limitation is made thereto by the present disclosure.

Accordingly, after the logic operation is performed on the encrypted data 50 by using the password string 40, the source data 30 can be obtained. The number of the bytes of the source data 30 is the same as that of the encrypted data 50 (i.e., 132 bytes).

During the encrypting process performed on the source data, the password string consisting of the SIM card code and the FIN code is used to perform the logic operation on the source data on as to encrypt the source data; and during the decrypting process performed on encrypted data, the password string is used to perform the corresponding logic operation on the encrypted data. Only when the user inputs the correct PIN code, can the password string be generated to restore the source data correctly, and an unauthorized user is unable to get the correct PIN code, and even if he/she knows the correct PIN code, it is impossible to get the correct SIM card code from the SIM card before the SIM card is inserted into the mobile phone. Therefore, the data-encrypting method and the data-decrypting method for the mobile phone of the present disclosure encrypt or decrypt documents stored in the mobile phone by combining the SIM card code and the PIN code into the password string so that the data of the mobile phone will not be stolen and security of the data can be protected.

In the data-decrypting method, if the logic operation used in the data-encrypting method is an XOR operation, then the logic operation used in the data-decrypting method should also be the XOR operation correspondingly. Of course, other logic operations such as the AND operation, the OR operation, or the NOT operation, etc., are also covered within the scope of the present invention, and no specific limitation is made thereto by the present disclosure. For example, if the logic operation in the data-encrypting method is the NOT operation, then the logic operation in the data-decrypting method should also be the NOT operation correspondingly. The XOR operation is the preferred for the present disclosure.

If it is chosen to put the encrypted-data ID code before the encrypted data 50 in the data-encrypting method, then the encrypted-data ID code before the encrypted data 50 needs to be removed correspondingly according to the IMEI number of the mobile phone in the decrypting method. Specifically, it may be that the IMEI number of the mobile phone is obtained, the number 30 of the bytes of the encrypted-data ID code is obtained according to the IMEI number, and then the data of 30 bytes before the encrypted data is removed to delete the encrypted-data ID code.

It shall be noted that, the encrypting/decrypting method described in the above embodiments may be implemented by programming in the practical design, e.g., may be implemented by using programming tools such as C, C++, and Java according to the inventive concepts disclosed above. Corresponding codes may be saved in the memory 104 and run by the baseband-signal processing chip 105 to achieve encryption/decryption of the data of the mobile phone. The baseband-signal processing chip 105 can control or access the peripheral devices such as the SIM card 109, the SD card slot 110, the keyboard 101, the LCD screen and the RF module 108 according to program codes so that operations such as interaction between users, data acquisition and data saving can be accomplished.

In order to further describe the technical solutions of the present disclosure, specific application examples based on the data encrypting/decrypting method for a mobile phone disclosed by the present disclosure will be specifically disclosed hereinafter with reference to FIG. 6 to FIG. 9.

Figure 6:
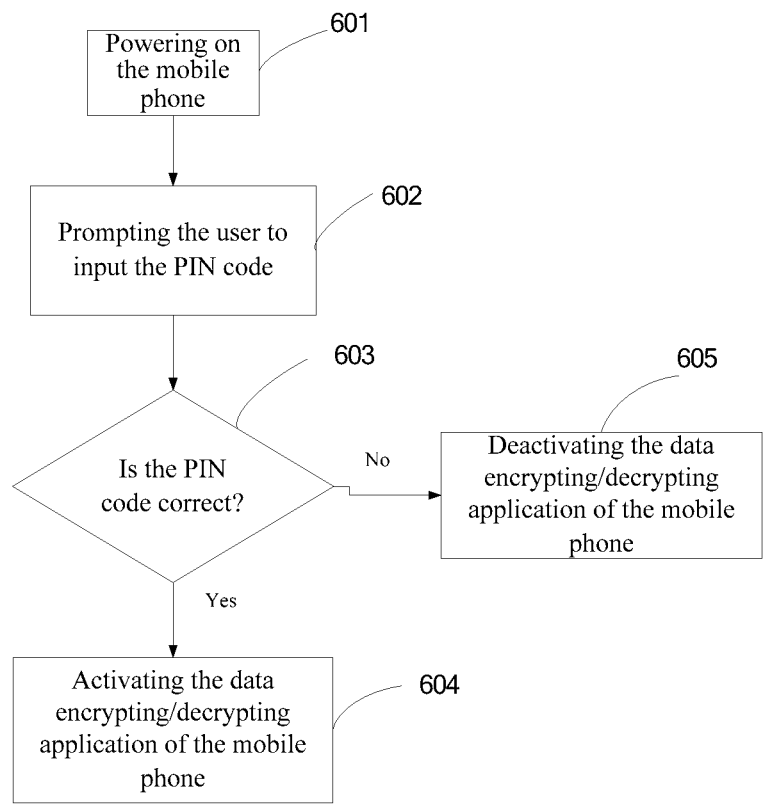
FIG. 6 is a flowchart diagram of a power-on PIN code detecting method based on the data encrypting/decrypting method for a mobile phone disclosed by the present disclosure.

Referring to FIG. 6, FIG. 6 is a flowchart diagram of a power-on PIN code detecting method based on the data encrypting/decrypting method for a mobile phone disclosed by the present disclosure. As shown in FIG. 6, the power-on PIN code detecting method comprises:

Step 601: powering on the mobile phone.

Step 602: prompting the user to input the PIN code, specifically, with subtitles on the LCD screen 103.

Step 603: detecting whether the PIN code is correct. Specifically, the PIN code input by the user is transmitted to the SIM card for detection, and step 604 is executed if the PIN code is detected to be correct; and otherwise, step 605 is executed.

Step 604: activating a data encrypting/decrypting application of the mobile phone.

Step 605: deactivating the data encrypting/decrypting application of the mobile phone.

In this embodiment, the data encrypting/decrypting application of the mobile phone mentioned in the step 604 and the step 605 is an application corresponding to the data encrypting/decrypting method for the mobile phone of the present disclosure. When the PIN code authentication fails, the data encrypting/decrypting application of the mobile phone is closed. In this case, the user of the mobile phone will be unable to encrypt data or decrypt the encrypted data.

Figure 7:
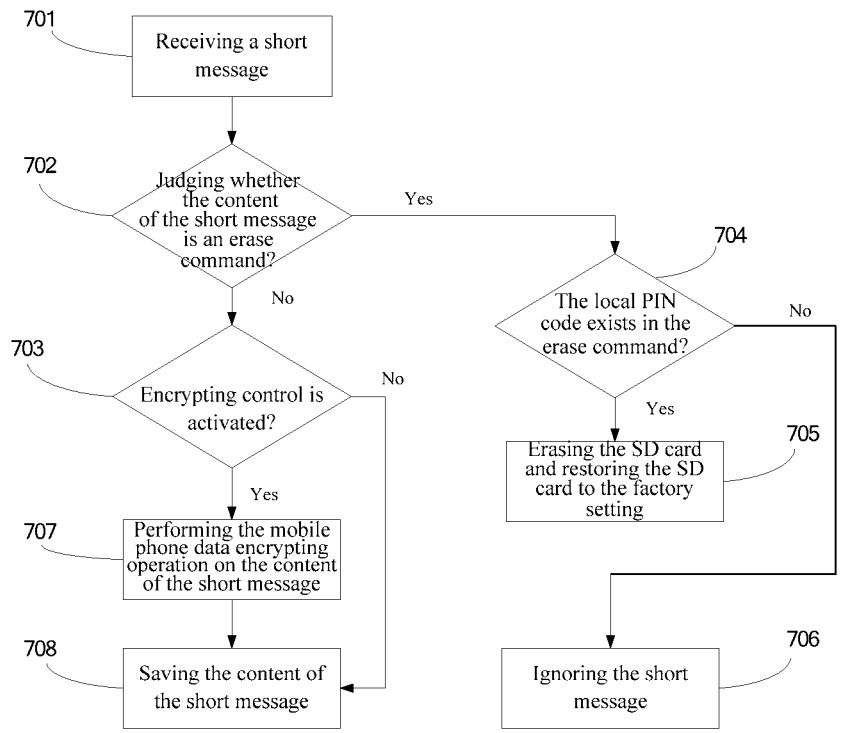
FIG. 7 is a flowchart diagram of an information remote erasing method based on the data encrypting/decrypting method for a mobile phone disclosed by the present disclosure.

Referring to FIG. 7, FIG. 7 is a flowchart diagram of a remote information erasing method based on the data encrypting/decrypting method for the mobile phone disclosed by the present disclosure. The remote information erasing method comprises:

Step 701: receiving a short message. This step is mainly executed by the RF module 108.

Step 702: J whether the content of the short message is an erase command. If the content of the short message is an erase command, step 704 is executed; and otherwise, step 703 is executed. The erase command is related to the local IMEI number (i.e., the IMEI number of the mobile phone that receives the short message). In a mobile phone that transmits the short message, two identical strings of the local IMEI numbers are combined into an erase command identification (ID) code (e.g., if the local IMEI number is 123456789012345, then the erase command ID code is 123456789012345123456789012345). The PIN code of the mobile phone that transmits the short message is put behind an erase ID command to form the erase command. Whether the content of a short message is an erase command can be determined by extracting the first 30 bytes of the content of the short message and then determining whether data in this byte segment is the erase command ID code.

Step 703: detecting whether the encrypting/decrypting application is activated. If the encrypting/decrypting application is activated, step 707 is executed; and otherwise, step 708 is executed directly.

Step 704: determining whether the local PIN code exists in the erase command. Specifically, a character string consisting of 4 bytes, i.e., the $31^{st}$ byte to the $34^{th}$ byte, of the content of the short message is extracted and it is detected whether this character string is the same as the PIN code stored in this mobile phone. If this character string is the same as the PIN code stored in this mobile phone, step 706 is executed; and otherwise, step 705 is executed.

Step 705: erasing all of the content in the SD card (if the SD card is not inserted into the mobile phone, this step will not be executed), and restoring the system of the mobile phone to the factory setting so that all data (e.g., photographs, videos, recordings, contacts, messages, or the like) in the memory 104 is also erased.

Step 706: ignoring the short message. That is, the short message is neither executed nor saved into an inbox.

Step 707: performing the mobile phone data encrypting operation on the content of the short message.

Step 708: saving the content of the short message.

Accordingly, if the user lost his/her mobile phone, the remote information erasing method based on the data encrypting/decrypting method for the mobile phone disclosed by the present disclosure can send a pre-edited short message that comprises the erase command to the mobile phone that has been lost. As a result, the mobile phone that has been lost can delete the data on the SD card and be restored to the factory setting. Thereby, the security of the data of the mobile phone of the user can be protected.

Figure 8:
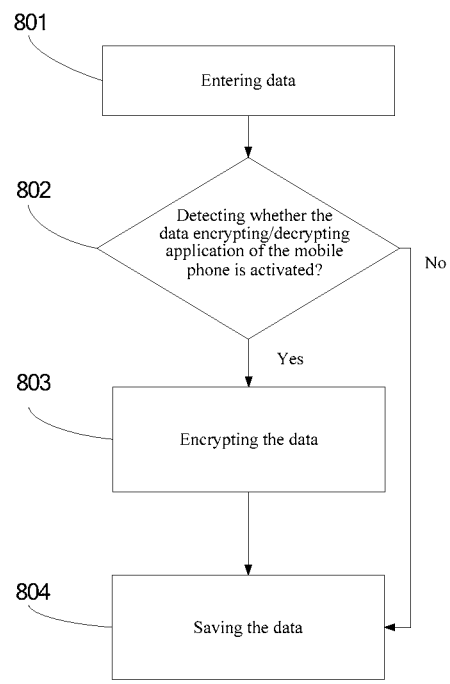
FIG. 8 is a flowchart diagram of a data entry method based on the data encrypting/decrypting method for a mobile phone disclosed by the present disclosure.

Referring to FIG. 8, FIG. 8 is a flowchart diagram of a data entry method based on the data encrypting/decrypting method for the mobile phone disclosed by the present disclosure. The data entry method is mainly used for data entered via peripheral devices such as a microphone or a camera and comprises the following steps:

Step 801: entering data, where the data entered refers to data entered via peripheral devices such as a microphone (not shown in FIG. 1) or a camera 102.

Step 802: detecting whether the data encrypting/decrypting application of the mobile phone is activated. If the data encrypting/decrypting application of the mobile phone is activated, step 803 is executed; and otherwise, step 804 is executed.

Step 803: encrypting the data.

Step 804: saving the data.

The data entry method can effectively ensure the security of the data entered via peripheral devices such as the microphone or the camera 102.

Figure 9:
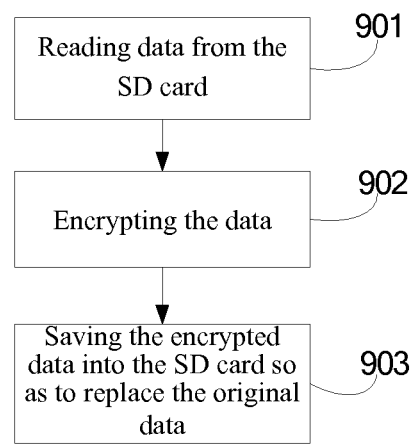
FIG. 9 is a flowchart diagram of a method for converting unencrypted data into encrypted data based on the data encrypting/decrypting method for a mobile phone disclosed by the present disclosure.

Referring to FIG. 9, FIG. 9 is a flowchart diagram of a method for converting unencrypted data into encrypted data based on the data encrypting/decrypting method for the mobile phone disclosed by the present disclosure. The method for converting unencrypted data into encrypted data is mainly used for data stored in the SD card because of the following reason: it is likely that the data is copied from a computer and needs to be encrypted, so this method is provided to prevent the leak of the information. The method comprises following steps:

Step 901: reading data from the SD card.

Step 902: encrypting the data.

Step 903: saving the encrypted data into the SD card so as to replace the original data.

Through the aforesaid encrypting operation, even if the SD card is lost, the encrypted data in the SD card will not be read easily by others. Thus, the method for converting unencrypted data into encrypted data can effectively protect the security of the data of the SD card.

As can be known from the above descriptions, the data-encrypting method and the data-decrypting method for the mobile phone disclosed by the present disclosure encrypt or decrypt documents stored in the mobile phone by combining the SIM card code and the PIN code into a password string so that the data of the mobile phone will not be stolen and the security of the data can be protected.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A data-encrypting method for a mobile phone, comprising:
    obtaining a PIN code input by a user and obtaining an SIM card code from an SIM card according to the PIN code, and combining the PIN code and the SIM card code into a password string;
    using the password string to encrypt source data so as to obtain encrypted data; and
    setting an encrypted-data identification (ID) code by using an IMEI number of the mobile phone, and putting the encrypted-data ID code before the encrypted data;
    wherein the step of using the password string to encrypt source data so as to obtain encrypted data comprises: reading the source data in units of a number of bytes of the password string; performing a logic operation on the password string and the source data that is read; and storing the source data, which has been performed the logic operation on, as the encrypted data;
    wherein the logic operation is an XOR operation.

2. A data-decrypting method for a mobile phone, comprising:
    obtaining a PIN code input by a user and obtaining an SIM card code from an SIM card according to the PIN code, and combining the PIN code and the SIM card code into a password string; and
    using the password string to decrypt encrypted data so as to obtain source data;
    wherein the step of using the password string to decrypt encrypted data so as to obtain source data comprises: reading the encrypted data in units of a number of bytes of the password string; performing a logic operation on the password string and the encrypted data that is read; and storing the encrypted data, which has been performed the logic operation on, as the source data;
    wherein the logic operation is an XOR operation.

3. A data-encrypting method for a mobile phone, comprising:
    obtaining a PIN code input by a user and obtaining an SIM card code from an SIM card according to the PIN code, and combining the PIN code and the SIM card code into a password string; and
    using the password string to encrypt source data so as to obtain encrypted data;
    wherein the step of using the password string to encrypt source data so as to obtain encrypted data comprises:
    reading the source data in units of a number of bytes of the password string;
    performing a logic operation on the password string and the source data that is read; and
    storing the source data, which has been performed the logic operation on, as the encrypted data.

4. The data-encrypting method for a mobile phone of claim 3, wherein the step of performing the logic operation on the password string and the source data that is read, comprises:
    performing the logic operation directly on the password string and the source data that is read when the number of the bytes of the source data that is read is equal to a number of bytes of the password string; and
    extracting a part of the password string, of which the number of the bytes is equal to the number of the bytes of the source data that is read, from the password string, and then performing the logic operation on the part of the password string and the source data that is read when the number of the bytes of the source data that is read is less than the number of the bytes of the password string.

5. The data-encrypting method for a mobile phone of claim 3, wherein after the step of using the password string to encrypt source data so as to obtain encrypted data, an encrypted-data identification (ID) code is set by using an IMEI number of the mobile phone, and the encrypted-data ID code is put before the encrypted data.

6. The data-encrypting method for a mobile phone of claim 3, wherein the logic operation is an XOR operation.

7. A data-decrypting method for a mobile phone, comprising:
    obtaining a PIN code input by a user and obtaining an SIM card code from an SIM card according to the PIN code, and combining the PIN code and the SIM card code into a password string; and
    using the password string to decrypt encrypted data so as to obtain source data;
    wherein the step of using the password string to decrypt encrypted data so as to obtain source data comprises:
    reading the encrypted data in units of a number of bytes of the password string;
    performing a logic operation on the password string and the encrypted data that is read; and
    storing the encrypted data, which has been performed the logic operation on, as the source data.

8. The data-decrypting method for a mobile phone of claim 7, wherein the step of performing a logic operation on the password string and the encrypted data that is read, comprises:
    performing the logic operation directly on the password string and the encrypted data that is read when the number of the bytes of the encrypted data that is read is equal to a number of bytes of the password string; and
    extracting a part of the password string, of which the number of the bytes is equal to the number of the bytes of the encrypted data that is read, from the password string, and then performing the logic operation on the part of the password string and the encrypted data that is read when the number of the bytes of the encrypted data that is read is less than the number of the bytes of the password string.

9. The data-decrypting method for a mobile phone of claim 7, wherein in the step of using the password string to decrypt encrypted data so as to obtain source data, an encrypted-data identification (ID) code put before the encrypted data is removed according to an IMEI number of the mobile phone.

10. The data-decrypting method for a mobile phone of claim 7, wherein the logic operation is an XOR operation.

* * * * *